United States Patent
Hait

[11] 3,736,865
[45] June 5, 1973

[54] FRUIT PROCESSING APPARATUS

[75] Inventor: James M. Hait, San Jose, Calif.

[73] Assignee: FMC Corporation, San Jose, Calif.

[22] Filed: Apr. 19, 1971

[21] Appl. No.: 135,256

[52] U.S. Cl. ............... 100/98 R, 100/108, 100/213, 99/513
[51] Int. Cl. .............................................. B30b 9/02
[58] Field of Search ..................... 100/37, 108, 213, 100/98 R; 146/3 J

[56] References Cited

UNITED STATES PATENTS

| | | |
|---|---|---|
| 3,236,175 | 2/1966 | Belk ..................................... 100/108 |
| 593,548 | 11/1897 | Baumgarten et al ................... 146/3 J |
| 2,420,679 | 5/1947 | Pipkin .............................. 100/98 R X |
| 473,043 | 4/1892 | Williams .............................. 100/213 |
| 2,475,559 | 7/1949 | Wilson .............................. 100/108 X |

Primary Examiner—Robert L. Bleutge
Attorney—F. W. Anderson

[57] ABSTRACT

A perforated finishing tube of a juicing machine receives a reciprocable one-piece tubular plunger which has a plurality of slots in its wall extending longitudinally of the plunger to define a plurality of finger-like members that move in close proximity to the inner surface of the discharge tube to remove fruit material caught in the perforations of the tube and extending inwardly thereof.

7 Claims, 5 Drawing Figures

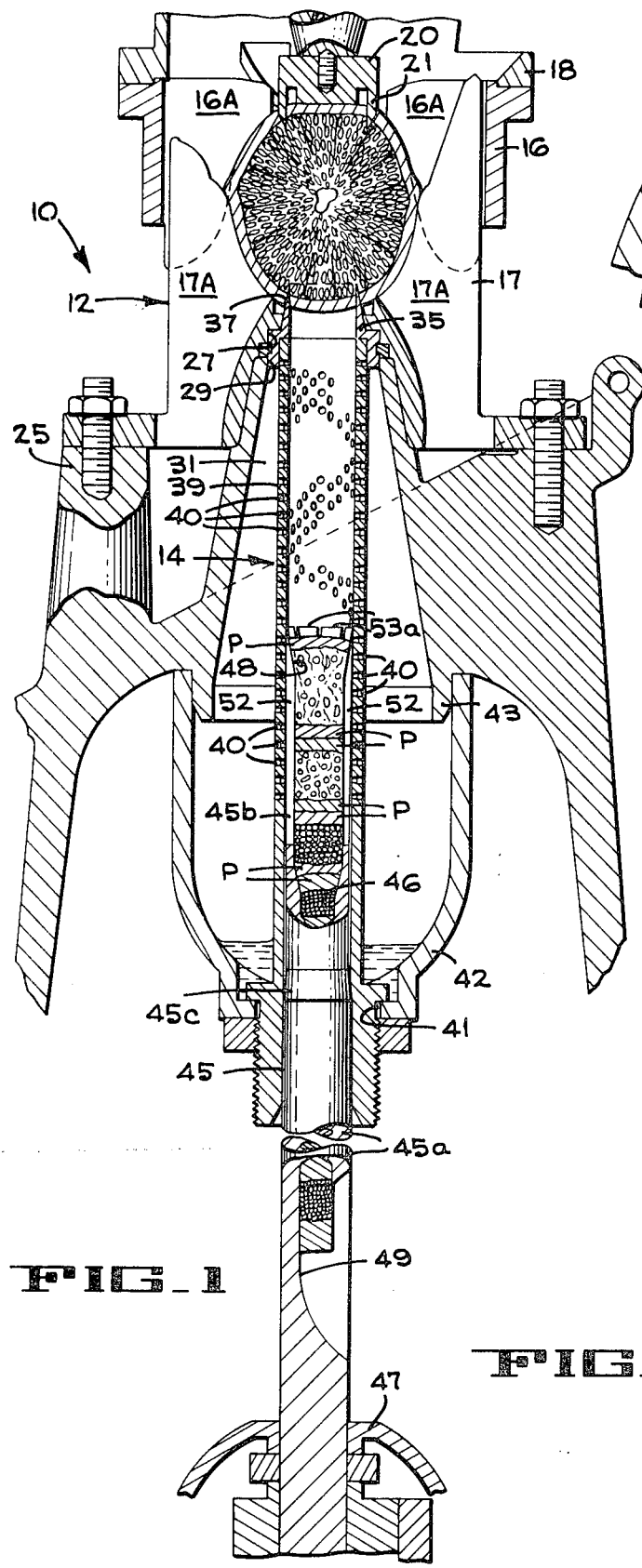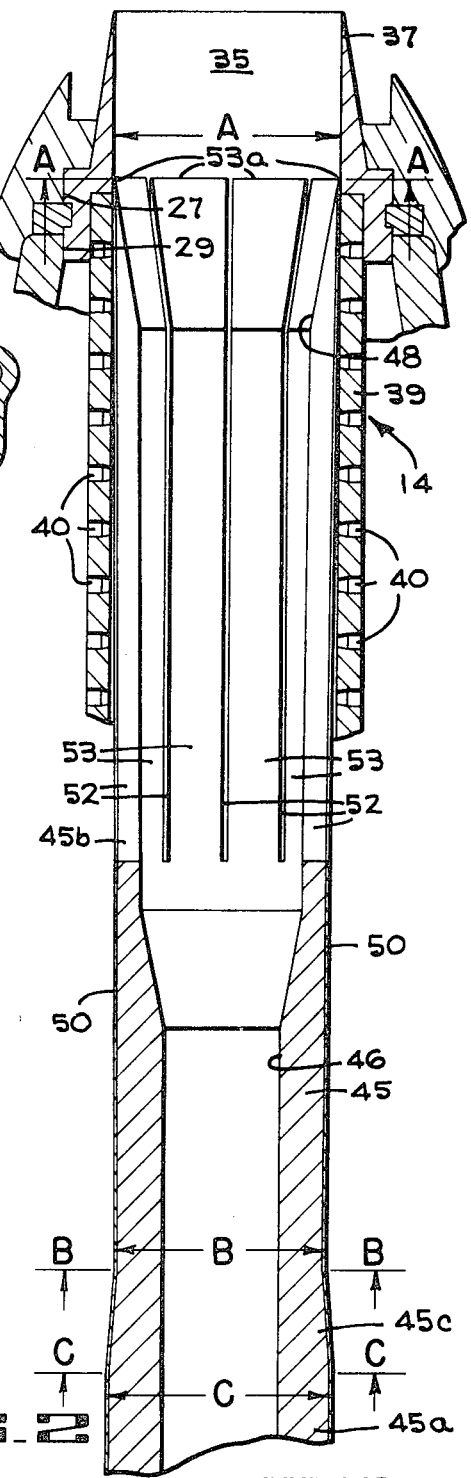

PATENTED JUN 5 1973 3,736,865
SHEET 2 OF 2
FIG_3
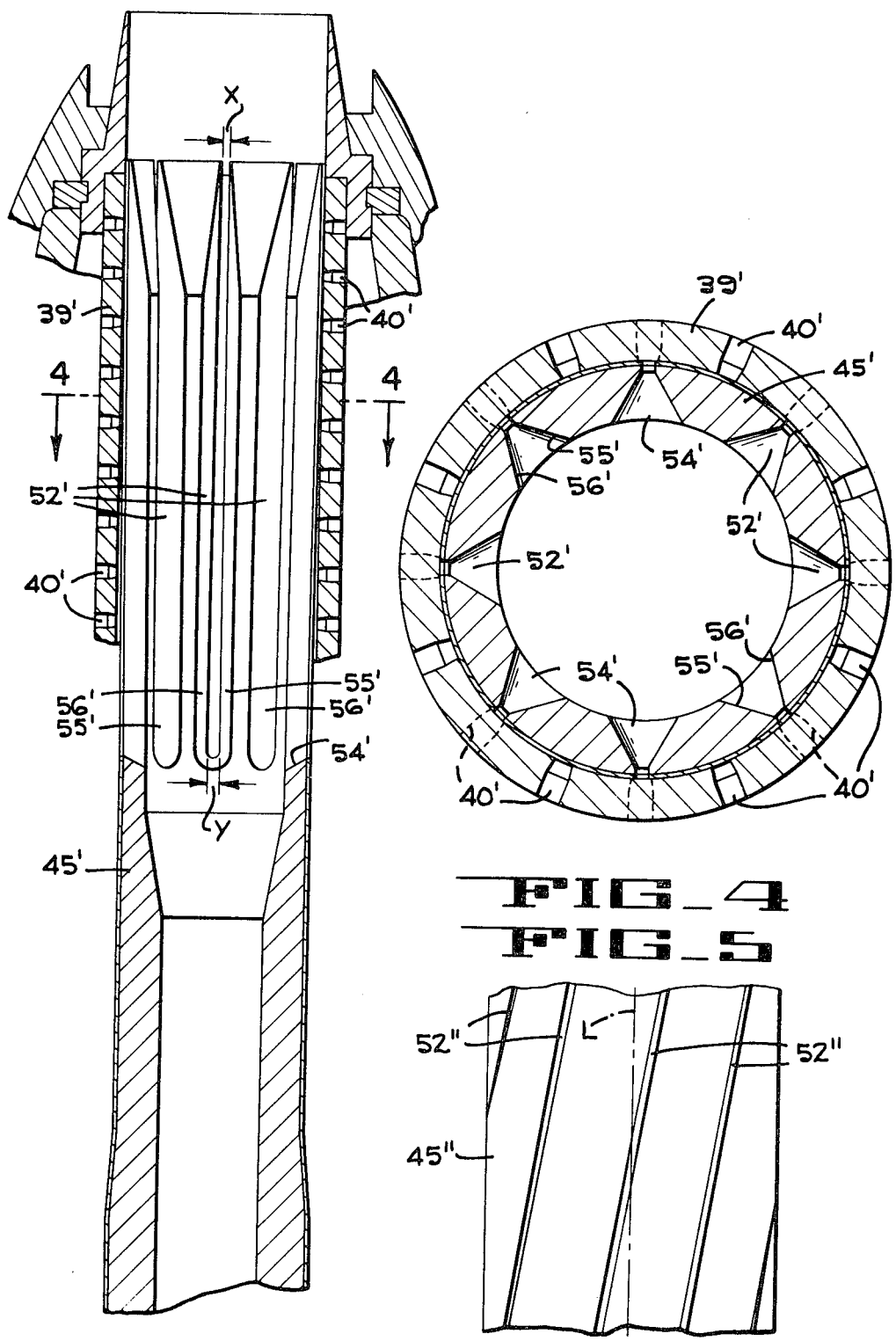
FIG_4
FIG_5
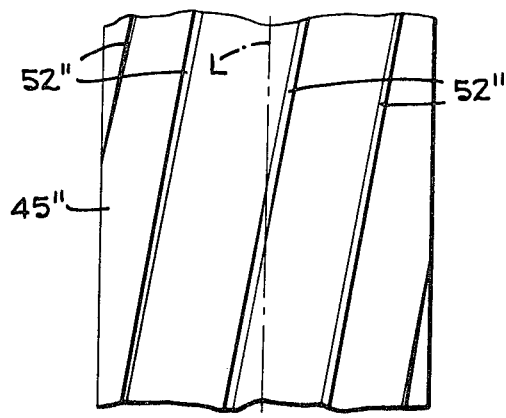

FRUIT PROCESSING APPARATUS

BACKGROUND OF THE INVENTION

In juice extractors of the type disclosed in the U.S. Patent to Hait No. 2,649,730, oranges are placed one-by-one between two opposed cups that move toward each other to squeeze the fruit, rupture the skin, and direct juice, seeds, pulp, and disc-shaped pieces of peel downwardly through a perforated cylindrical finishing tube. As the juice and other material move downwardly, a plunger moves upwardly to receive the peel segments, seeds and pulp in a central axial passage in the plunger and to force juice laterally through the perforations of the tube into a collection chamber.

During the separation of the juice from the pulp and seeds, many of the fine fibers and membranes of the pulp are pressed against the perforated inner surface of the discharge tube and become caught in the perforations so that they hang partially within the tube. To prevent the buildup of material on the inner wall of the finishing tube, the upper edge of the plunger is sharpened, and is designed to maintain close contact with the inner surface of the tube during the upward movement of plunger, thereby severing fibers or other material caught in the tube perforations.

The U.S. Patent to Hait No. 2,649,730 discloses a continuous annular cutting edge formed integrally on the upper edge of the finishing plunger, while the U.S. Patent to Belk No. 2,856,846 discloses a relatively short, cylindrical cutter that is split along its length. This cutter is removably secured to the upper end of the plunger and, due to its resiliency and pressure in the tube, its upper sharpened edge maintains close, scraping contact with the inner surface of the perforated tube.

It is an object of the present invention to provide an improved plunger which will cooperate in an efficient manner with the finishing tube of a juice extractor to separate juice from seeds, pulp and the like.

Another object is to provide a plunger having an integral upper cutting edge that is capable, due to its unique construction, of maintaining close contact with the inner wall of the finishing tube.

BRIEF SUMMARY OF THE INVENTION

The plunger of the present invention is a cylindrical tubular member that has a sharpened upper edge and a plurality of slots in its wall extending downwardly from the upper edge in a direction longitudinally of the plunger. The slots are spaced from each other around the periphery of the tube to define a plurality of upwardly-extending fingers whose sharpened and curved upper edges are moved outwardly, during upward movement of the plunger, to scrape the inner wall of the cylindrical discharge tube.

IN THE DRAWINGS

FIG. 1 is a fragmentary longitudinal section of a juice extracting mechanism embodying the plunger of the present invention, the section being taken along the common axis of the fruit-squeezing cups and the finishing tube.

FIG. 2 is an enlarged fragmentary view of a portion of FIG. 1.

FIG. 3 is a view similar to FIG. 2 showing a second embodiment of the plunger of the present invention.

FIG. 4 is a section taken on line 4—4 of FIG. 3.

FIG. 5 is a fragmentary side elevation of a third embodiment of the plunger of the present invention.

DESCRIPTION OF A PREFERRED EMBODIMENT

The improved plunger of the present invention is illustrated in FIG. 1 in connection with a citrus fruit juice extracting apparatus 10 of the type described and claimed in the U.S. Patent to Belk et al. No. 2,780,988. Only those portions of the entire juice extractor 10 that are necessary for an understanding of the present invention have been shown; for complete details of the construction and operation of the juice extractor 10, reference should be had to the above-mentioned patent.

In general, the juice extractor 10 comprises a whole-fruit squeezing mechanism 12, and a cooperating juice-separating apparatus 14. The fruit squeezing mechanism 12 comprises a pair of digitated, upper and lower cups 16 and 17, respectively, each of which is provided with a plurality of spaced blades or fingers 16A and 17A, respectively. The upper cup 16 is secured, in a downwardly-opening orientation, to a vertically reciprocable head 18 which also carries a cutter assembly 20 that has a downwardly directed circular blade 21. The blades 16A of the upper cup are mounted for reciprocating vertical movement into and out of interdigitation with the upwardly projecting blades 17A of the lower cup 17 which is rigidly supported on a stationary bedplate 25 in an upwardly facing position in vertical alignment with the upper cup. The lower cup 17 and the bedplate 25 are provided with vertically aligned apertures 27 and 29, respectively, which communicate with a frusto-conical chamber 31 formed in the bedplate 25. A tubular knife 35 fits tightly within the apertures 27 and 29 and has an annular blade 37 that extends upwardly beyond the aperture 27 into the cavity of the lower cup 17. The lower end of the knife 35 abuts the upper end of a cylindrical finishing tube 39 the axis of which is aligned with the axes of the apertures 27 and 29 and with the knife 35. The finishing tube forms a part of the juice-separating apparatus 14 and has a multiplicity of small perforations 40 provided in the upper portion of its wall. The tube 39 is removably fastened in an aperture 41 provided in the bottom of a juice collecting sump 42 that is secured in sealed relation to the wall 43 defining the lower end of the chamber 31.

The finishing tube 39 slidably receives a pressure exerting member in the form of an elongated plunger or orifice tube 45 that is fastened in an upwardly extending position to a crosshead 47, only a fragment of which is shown. The crosshead 47 is operatively connected with the upper cup-supporting head 18 for vertical reciprocation in timed relation therewith, in a manner fully disclosed in the above-mentioned Belk et al. U.S. Pat. No. 2,780,988. The plunger 45 is provided with an axial passage 46 which communicates at its upper end with the interior of the finishing tube 39 through an upwardly flaring mouth 48 in the upper end of the plunger. The lower end of the axial passage 46 communicates with a longitudinal slot 49 milled in the side of the plunger adjacent its point of attachment to the crosshead 47.

The finishing tube 39 may be made as a forging from 303 or 304 stainless steel. The inner surface of the tube is preferably built up with hard chrome plating to a thickness of approximately 0.006 to 0.008 inch and then honed to the desired internal diameter. The perforations 40 are drilled in the tube before the tube is chrome-plated, and each perforation may be in the range of from 0.040 to 0.090 inch in diameter.

The plunger 45 is a stainless steel member that has a coating 50 (FIG. 2) of Stellite on its exterior surface. The plunger has three segments: a lower cylindrical segment 45a of diametral dimension C that is slidably journaled in the lower end of the finishing tube 39; an upper segment 45b that is frusto-conical in configuration, having a diametral dimension A at the upper end that is larger than the corresponding dimension B at the lower end; and a transition segment 45c between segments 45a and 45b. Eight slots 52 are cut in the wall of the tube section 45b at 45° intervals around the periphery to define eight finger-like members 53 which have upper sharpened edges 53a.

One commercial juice extractor has a finishing tube that has an internal diameter of 1.00 inch. According to the present invention, the plunger used with this tube could have an "A" dimension of 0.998 inch at section A—A, a "B" dimension of 0.937 inch at section B—B, and a "C" dimension of 0.998 inch at section C—C. Each of these dimensions includes the Stellite coating which is approximately 0.018 inch thick. The plunger body is made of stainless steel bar stock and machined to provide the central passage in the plunger, a dimension of 0.901 inch at B—B and a dimension of 0.962 inch at C—C and A—A. After the surface of the plunger is sandblasted, a bond coat of Metco 404 (nickel aluminide) is applied thereto, followed by a coating of Stellite powder. The powder is fused on the plunger at a temperature of approximately 2200° F., and then the exterior surface is brought to the above-mentioned A, B and C dimensions by grinding. In a final operation, the eight slots 52, approximately 1/16 of an inch wide, are cut in the wall of the plunger.

Referring to FIG. 1, it will be noted that during the upward movement of the plunger 45, the central passage of the plunger is filled with pulp, seeds, and plugs P cut from oranges that have been squeezed previously. Accordingly, the plunger acts somewhat as a piston as it moves upwardly and considerable pressure is developed in the chamber above the plunger. In accordance with the present invention, the slots 52 are made long enough, in view of the thickness of the plunger wall in the vicinity of the slots and in view of the pressure generated in the chamber and internally of the plunger, so that the upper edges 53a of the fingers 53 will be pressed into close contact with the surface of the finishing tube. Also, it should be noted that after the upper edges of the finger members 53 pass above the uppermost perforations 40 in the finishing tube, as shown in FIG. 2, the slots 52 still permit juice to move outwardly of the central chamber of the plunger for passage through the perforations into the collection chamber.

In FIG. 2 the plunger is shown as having a deeply flared upper end portion. It is within the scope of the invention to make this tapered section of less depth as long as the upper sharpened edge portions 53a are retained.

In FIGS. 4 and 5 a second embodiment of the present invention is shown. In this embodiment the members are substantially identical in construction and operation as the members of the embodiment of FIGS. 1 and 2, and similar parts will be assigned identical reference numerals with the addition of a prime marking. The embodiment of FIGS. 3 and 4 differs from that of FIGS. 1 and 2 in that each of the slots 52' of plunger 45' has a dimension "X" at its upper end that is less than its dimension "Y" at its lower end. Also, the lower surface 54' of each slot is beveled inwardly and downwardly and, as seen in FIG. 4, the inner walls 55' and 56' of each slot are slanted away from each other to define an inwardly opening passage. These features of the slot aid in keeping the lower end of the slot open and unclogged during operation.

While the slots in the embodiments of FIGS. 1 and 3 are substantially parallel to the axis of the plunger, they may be constructed so that they have a twisting or helical configuration, or they may be straight slots 52'' that are at a small angle to an imaginary longitudinal line L (FIG. 5) that is parallel to the axis of the plunger 45''. The inclination of the edges of the slot provides auxiliary scraping edges that will shear any fibrous material, projecting inwardly from the finishing tube perforations, that was missed or imperfectly sheared by the upper edges of the plunger.

Having thus described my invention, what I claim as new and desire to protect by Letters Patent is:

1. Apparatus for separating liquid and solid material comprising a perforated finishing tube adapted to receive a liquid and solid mass that has been squeezed from a fruit; and a tubular plunger movable within said tube for exerting pressure on the mass to force the liquid portion thereof out of the tube through its perforations, said tubular plunger having a shearing edge and a plurality of slots extending through the wall of said end portion of said tubular plunger, said slots being spaced from each other at relatively short intervals about said plunger and being relatively long as compared with the intervals between said slots and the thickness of the wall of said plunger in order to provide finger members adapted to move outwardly into close scraping contact with the inner surface of said finishing tube at their distal ends defined by said shearing edge during movement of said plunger through said tube.

2. Apparatus according to claim 1 wherein the slotted end portion of said plunger is of reduced diameter at a point spaced from said sharpened edges to provide clearance between said plunger and the inner wall of said finishing tube.

3. Apparatus according to claim 1 wherein the slotted end portion of said plunger is generally frusto-conical in configuration, having the largest diameter at said sharpened edges.

4. Apparatus according to claim 1 wherein said slots are of a width sufficient to pass juice but prevent passage of seeds and pulp material.

5. Apparatus according to claim 1 wherein said slots extend longitudinally of said plunger.

6. Apparatus according to claim 1 wherein said slots have a spiral configuration.

7. Apparatus according to claim 1 wherein said slots are inclined relative to an imaginary line that extends longitudinally along the adjacent periphery of said plunger parallel to the axis of said plunger.

* * * * *